(12) United States Patent
Dutoit et al.

(10) Patent No.: US 7,170,140 B2
(45) Date of Patent: Jan. 30, 2007

(54) MICROELECTROMECHANICAL SYSTEM

(75) Inventors: Bertrand Dutoit, Baulmes (CH);
Sophie Birling, Neuchâtel (CH);
Jean-Michel Stauffer, Neuchâtel (CH);
Yves Dupraz, Montagny-près-Yverdon (CH)

(73) Assignee: Colibrys SA, Neuchatel (CH)

( * ) Notice: Subject to any disclaimer, the term of this patent is extended or adjusted under 35 U.S.C. 154(b) by 157 days.

(21) Appl. No.: 11/070,786

(22) Filed: Mar. 2, 2005

(65) Prior Publication Data
US 2005/0194652 A1    Sep. 8, 2005

(30) Foreign Application Priority Data
Mar. 2, 2004    (EP)    ................... 04100839

(51) Int. Cl.
*H01L 29/82*    (2006.01)
(52) U.S. Cl. ..................................... 257/417
(58) Field of Classification Search ......... 257/415–420
See application file for complete search history.

(56) References Cited

U.S. PATENT DOCUMENTS

| | | | | |
|---|---|---|---|---|
| 5,627,397 | A | * | 5/1997 | Kano et al. ................. 257/417 |
| 5,777,226 | A | | 7/1998 | Ip |
| 6,105,428 | A | | 8/2000 | Schmiesing et al. |
| 2001/0047688 | A1 | | 12/2001 | Woodruff et al. |

FOREIGN PATENT DOCUMENTS

| | | |
|---|---|---|
| JP | 1163620 | 6/1989 |
| WO | WO 03/023414 A1 | 3/2003 |

* cited by examiner

*Primary Examiner*—Cuong Nguyen
(74) *Attorney, Agent, or Firm*—Pearne & Gordon LLP

(57) ABSTRACT

Microelectromechanical system (MEMS) comprising:
an active part (5) comprising an electromechanical device (28),
at least one base (6) for fastening said microsystem on a support (8),
at least one fastener (21, 21') fastening said active part (5) to said at least one base (6) and allowing a displacement of said active part (5) relatively to said at least one base (6) along an axis (Z) more or less perpendicular to the plane of said support (8) when said microsystem is fastened onto said support (8), bumper elements (27, 27', 37') for limiting the amplitude of the displacements of said active part (5) relatively to said at least one base (6) along said perpendicular axis (Z).

The active part (5) being capable of moving relatively to the base (6) to which it is fastened, it is isolated from any mechanical constraint that could be sustained by the base (6), in particular torsion or flexion due to it being fastened onto a support (8). On the other hand, since the movements of the active part (5) are limited by the bumper elements (27, 37, 27', 37'), it can be guaranteed thanks to the invention that the fastener or fasteners (21, 21') will not be stretched beyond their elasticity range, thus avoiding their irreversible deformation and/or their rupture.

36 Claims, 2 Drawing Sheets

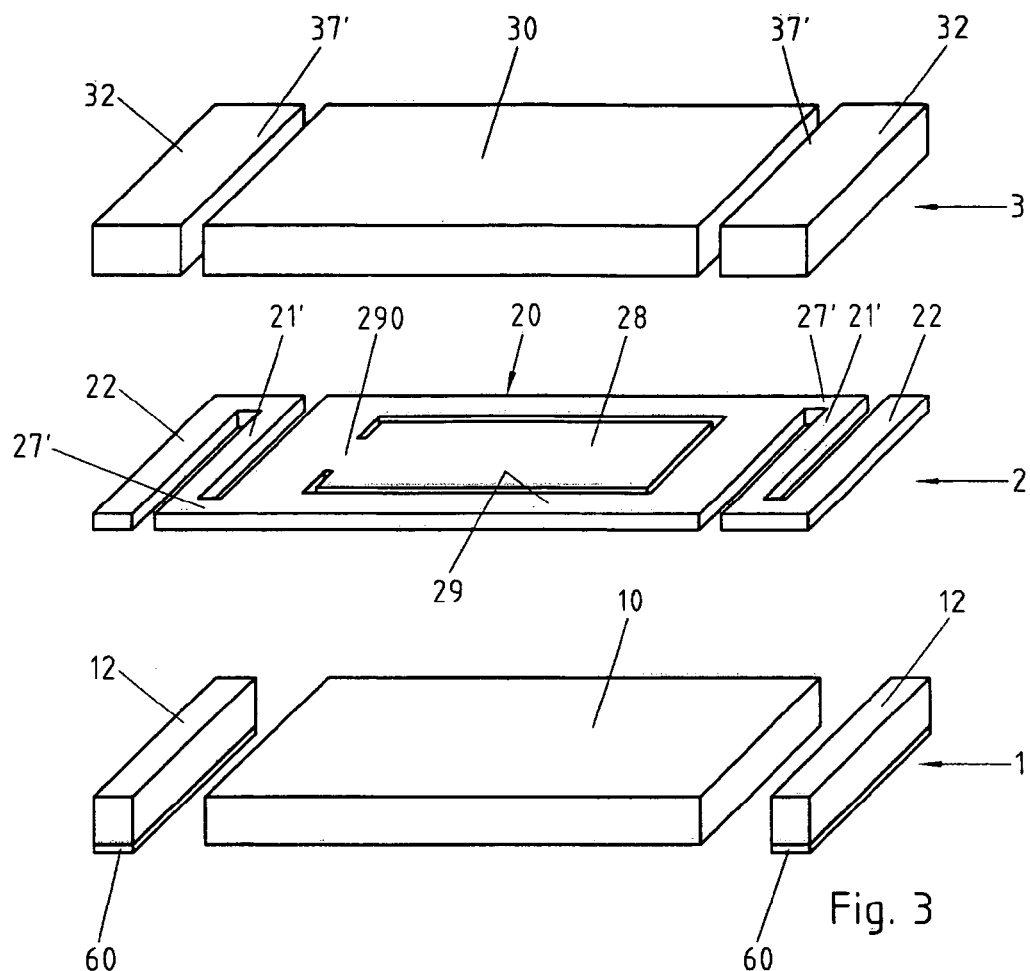
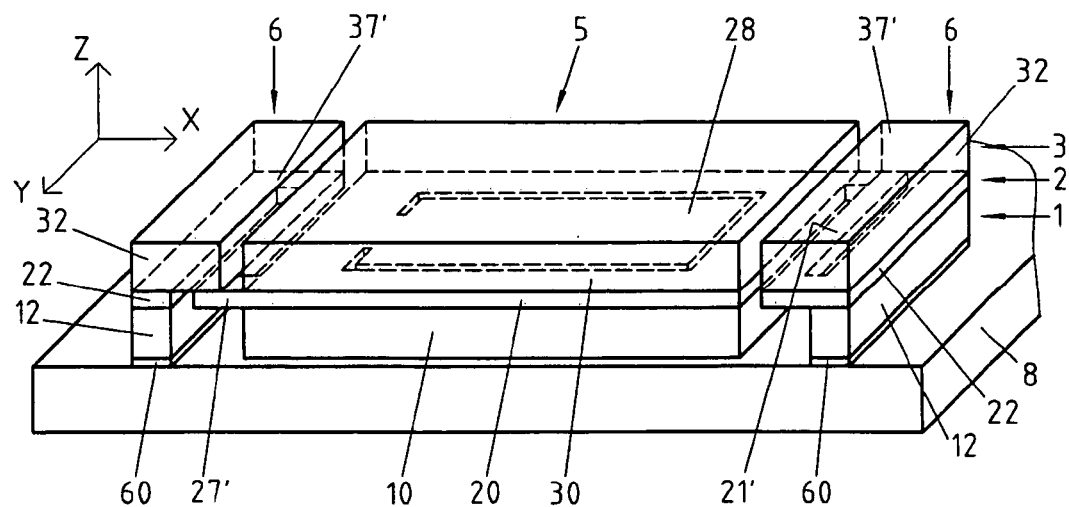
Fig. 3
Fig. 4

MICROELECTROMECHANICAL SYSTEM

REFERENCE DATA

This application claims priority of 2004EP-100839 filed on Mar. 2, 2004, the contents whereof are hereby incorporated by reference.

FIELD OF THE INVENTION

The present invention concerns a microelectromechanical system (MEMS, Micro Electro Mechanical System). The present invention concerns in particular an accelerometer in the form of a microelectromechanical system.

DESCRIPTION OF RELATED ART

Microelectromechanical systems or MEMS are miniaturized systems made from micro- and nanotechnologies derived from microelectronics. They generally integrate mechanical and/or electromechanical elements formed by structuring one or several layers of semiconductor substrate. Among the applications for MEMS are for example accelerometers, optical switching systems, micromotors, etc. The use of MEMS allows a miniaturization of these components as well as an integration of the possible electronic circuits required for controlling them.

An accelerometer generally comprises a centrifugal mass capable of moving along at least one axis and whose displacement, when the accelerometer is subjected to an acceleration along this axis, induces the variation of a physical quantity, for example of an electrical value. Measuring this variation will then allow the absolute value and/or the direction of acceleration to which is subjected the accelerometer and/or the element to which it is fastened to be determined.

A capacitive accelerometer comprises for example an electrically conducting centrifugal mass, placed opposite at least one preferably fixed electrode without being in contact with it. The whole thus forms a capacitor whose mechanical and electrical properties, in particular the capacity, vary according to the displacements of the centrifugal mass.

According to one measuring method, the accelerations to which the accelerometer is subjected are determined by measuring the variations in capacity induced by the displacements of the centrifugal mass. This is called direct measurement.

According to an equivalent method, electrostatic forces are applied on the centrifugal mass and on the electrode, so that the relative position of these two elements remains stable. The measurement of the variations in capacity then serves as error signal for regulating the applied forces, with the variations of these forces serving then for the measurement of the accelerations borne by the centrifugal mass.

Whatever the measuring method chosen, the accuracy of the measurement will strongly depend on the mechanical stability of the accelerometer, in particular on the geometry of its electrode or electrodes and on the distance between them and the centrifugal mass at rest.

Accelerometers are used in many applications. Generally, they can be fastened to any object whose accelerations one wishes to measure. For certain applications, the accelerometer's size is an essential element, the latter being often preferably as small as possible in order to allow the accelerometer to be optimally integrated. The accelerometer's mass is also preferably minimal in order to minimize its influence on the object of the measurement.

Certain particularly small and light accelerometers are MEMS generally formed by structuring several distinct and superimposed layers of a semiconductor material, for example silicon. This construction allows miniaturized accelerometers to be made whose largest dimensions do not exceed several millimeters.

However, since the distance between the centrifugal mass and the electrode or electrodes of such accelerometers is also very small, the latter are especially sensitive to mechanical deformations, even very mild. This is why it is essential that their active part, i.e. the part comprising the centrifugal mass and the electrode or electrodes, should be mechanically as stable as possible. Yet the practically unavoidable constraints exerted on such an accelerometer by it being fastened onto a support, in particular a possible torsion or flexion due to irregularities of the adhesive forces or of the supporting surface, are often sufficient to cause deformations of the active part, inducing perceptible measuring errors, for example because of deformation of the electrodes.

International application WO00/79287 and patent U.S. Pat. No. 6,634,231 describe for example solutions allowing the accelerometer's active part to be at least partially isolated from the mechanical constraints exerted on its fastening elements. According to these solutions, the accelerometer is fastened only by a rigid frame to which the active part is connected by fasteners having a certain flexibility. The mechanical constraints exerted on the frame are thus absorbed by the fasteners instead of being reverberated on the active part.

A major disadvantage of these constructions is that their mechanical resistance is limited by the fasteners resistance. In fact, beyond a certain acceleration, the displacement of the active part relatively to the rigid frame will provoke an irreversible deformation, or even a rupture of the fasteners, and therefore the destruction of the accelerometer.

Such accelerometers cannot consequently be subjected to considerable accelerations without risking becoming irreversibly damaged. They are thus particularly sensitive to shocks and cannot be used in certain applications such as for example in ballistics where the accelerations can momentarily reach several tens of thousands times the g acceleration due to the force of gravity.

It is thus an aim of the invention to propose an accelerometer having a maximal mechanical resistance to strong accelerations.

BRIEF SUMMARY OF THE INVENTION

These aims are achieved by an accelerometer having the characteristics of the independent claim, advantageous variant embodiments being furthermore given by the dependent claims and by the description.

These aims are achieved in particular by a microelectromechanical system (MEMS) comprising:
- an active part comprising an electromechanical device,
- at least one base for fastening the microsystem on a support,
- at least one fastener fastening the active part to the base and allowing a displacement of the active part relatively to the base along an axis more or less perpendicular to the support's plane when the microsystem is fastened on the support,
- bumper elements for limiting the amplitude of the displacements of the active part relatively to the base along the perpendicular axis.

Since the active part is capable of moving relatively to the base to which it is fastened, it is isolated from any mechanical constraint that the base could bear, in particular torsion and/or flexion due to it being fastened onto a support. Furthermore, since the movements of the active part are limited by bumper elements, it can be guaranteed thanks to the invention that the fastener or fasteners will not extend beyond their elasticity range, thus avoiding their irreversible deformation and/or rupture.

BRIEF DESCRIPTION OF THE DRAWINGS

The present invention will be better understood by the description of preferred embodiments illustrated by the FIGS. 1 to 4, showing:

FIG. 3 an exploded and diagrammatic view of an accelerometer according to another embodiment of the invention.

FIG. 4 an accelerometer according to another embodiment of the invention, fastened onto a support.

DETAILED DESCRIPTION OF POSSIBLE EMBODIMENTS OF THE INVENTION

Figure 1:
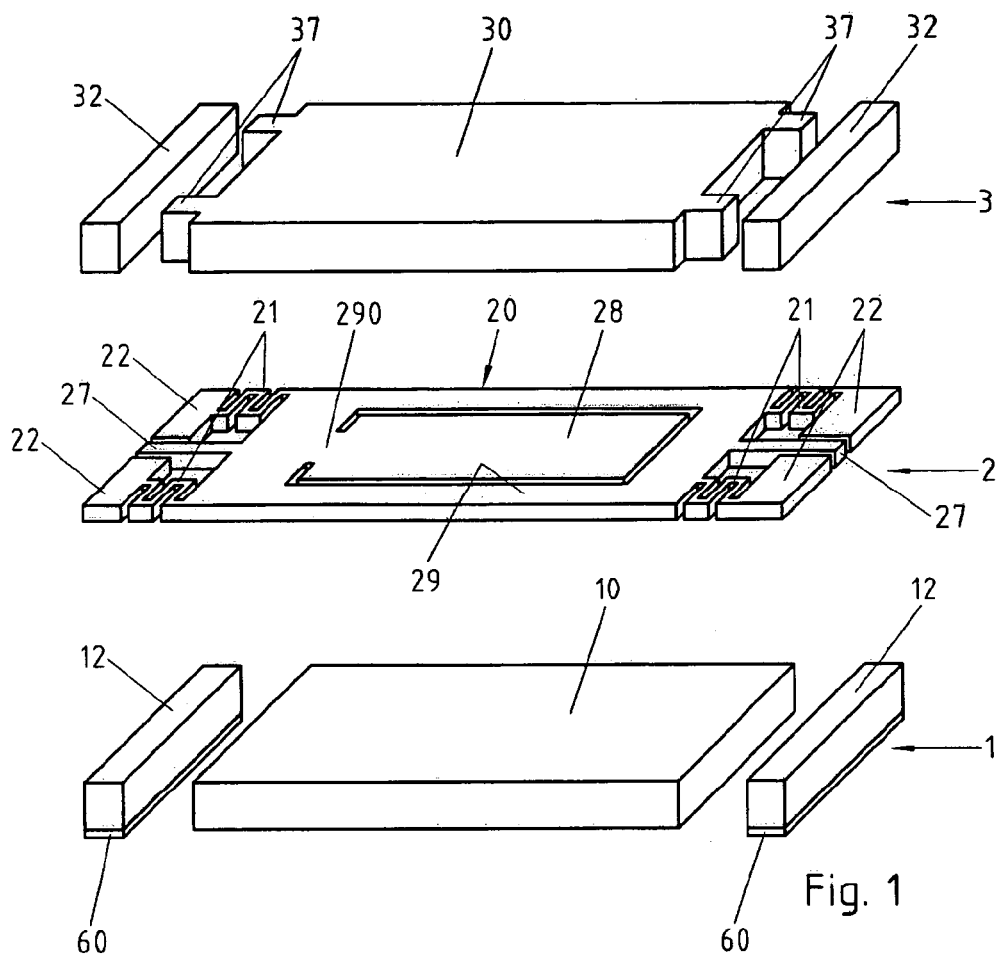
FIG. 1 an exploded and diagrammatic view of an accelerometer according to a preferred embodiment of the invention.
Figure 2:
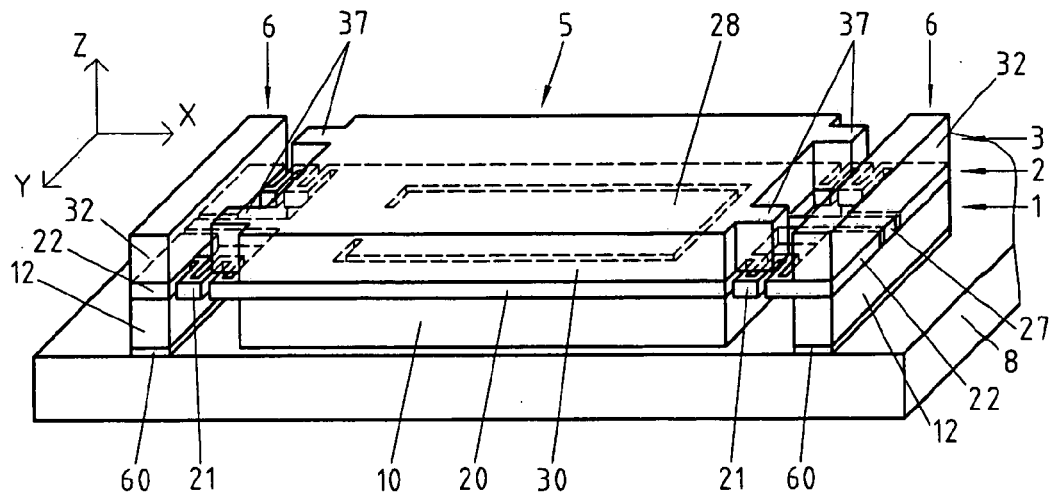
FIG. 2 an accelerometer according to a preferred embodiment of the invention, fastened onto a support.

According to a preferred embodiment illustrated by the FIGS. 1 and 2, the microelectromechanical system (MEMS, Micro Electro Mechanical System) of the invention is an accelerometer comprising three distinct layers 1, 2, 3 of a semiconductor material, for example of silicon. The three layers 1, 2, 3 are preferably electrically isolated from one another by insulating layers (not represented) covering at least partially their contiguous sides and contributing to their mechanical interconnection. These isolating layers are formed for example by oxidation of the corresponding silicon layer's surface and can be structured according to needs by known techniques, for example of photolithography.

For reasons of simplification, only the structurations of the semiconductor layers 1, 2, 3 are represented in FIGS. 1 and 2.

The lower layer 1 and the upper layer 3 are structured, for example by photolithography, so as to form a central part 10, resp. 30 and base elements 12 resp. 32 distinct from one another, preferably completely separated mechanically. On the central parts 10 resp. 30 of the lower layer 1 and upper layer 3 are formed electrodes (not represented). These electrodes are formed for example by local implantation of semiconductor material and are designed to be placed, in the assembled accelerometer, opposite the centrifugal mass 28.

The upper layer 3 further comprises on its central part 30 bumpers 37 whose role will be described further below. These bumpers 37 are preferably constituted of protruding parts formed on the sides of the central part 30 opposite the base elements 32. The length of these bumpers 37 is preferably perceptively shorter than the length of the sides of the central part 30 on which they are formed. According to a variant embodiment (not represented) of the invention, the central part comprises only a single bumper on each side oriented opposite the base elements 32. The length of these bumpers can then be identical to the length of the side itself.

The middle layer 2 is structured, for example by photolithography, so as to form a central part 20 with dimensions preferably more or less equal to the dimensions of the central parts 10 resp. 30 of the lower layer 1 and upper layer 3. The middle layer 2 also comprises base elements 22 designed to be assembled to the corresponding base elements 12, 32 of the other layers. The central part 20 of the middle layer 2 is structured so as to form a centrifugal mass 28 preferably surrounded by a frame 29 to which it is connected by at least one flexible zone 290 allowing it to move along at least one axis relatively to the latter.

The central part 20 is connected to base elements 22 by fasteners 21 also structured in the middle layer 2. In the example illustrated by the figures, the central part 20 is rectangular and a fastener 21 connects each of its angles to the closest base element 22. The one skilled in the art will however understand that other arrangements of the fasteners and/or a different number of fasteners is perfectly conceivable within the framework of the invention.

The fasteners 21 have a certain elasticity allowing a displacement of the central part 20 relatively to the base elements 22 without this causing them to become irreversibly deformed. The shape of the fasteners 21 is preferably chosen so as to present the desired mechanical characteristics, in particular the sought elasticity along the possible axis or axes of displacement of the central part 20 whilst being as compact as possible.

According to a preferred embodiment, the fasteners 21 allow, within their elasticity range, a displacement of the central part 20 relatively to the base elements 22 along three linearly independent axes X, Y, Z. Preferably, the fasteners 21 also allow a rotation of the central part 20 relatively to the base elements 22 around these three axes X, Y, Z without implying their irreversible deformation. The central part 20 is thus entirely uncoupled from the constraints, in particular possible torsion or flexion, that can be exerted on the base elements 22. As will be explained further below, the fasteners 21 are preferably structured so as to offer a maximum elasticity along an axis X more or less parallel to the plane of the support 8 when the accelerometer is fastened to it and a reduced elasticity along the axes Y and Z.

In the assembled accelerometer, represented in FIG. 2, the centrifugal mass 28 is suspended between the two electrodes by the flexible zone connecting it to the frame surrounding it. Each electrode thus forms with the centrifugal mass a capacitor whose capacity depends on the surface of the centrifugal mass, on the surface of the corresponding electrode, on the distance separating these two elements and on the dielectric constant of the matter, generally of air, existing between them. When the accelerometer is subjected to an acceleration in a direction Z more or less perpendicular to the plane of the support 8, the centrifugal mass moves in the direction of one or the other of the electrodes in the direction of the acceleration, causing a variation in the capacities of these capacitors. The measure of this variation, or of the electrostatic forces necessary to counter this variation, thus allows the intensity and the direction of the acceleration to be determined.

In the example illustrated, the measuring axis of the accelerometer corresponds to an axis Z more or less perpendicular to the plane of the support 8. The one skilled in the art will however understand that it is perfectly conceivable within the framework of the invention to form the centrifugal mass and the electrode or electrodes in order to obtain an accelerometer having an other measuring axis, for example a measuring axis corresponding to an X or Y axis more or less parallel to the plane of the support 8, or even an accelerometer having two or three linearly independent measuring axes X, Y or Z.

According to a preferred embodiment, the two electrodes have the same surface and the same disposition relative to the centrifugal mass 28, and the latter is suspended at equal distance to each electrode when it is not subjected to any acceleration. In this manner, as the matter between each electrode and the centrifugal mass 28 is identical, the capacities of the two capacitors are identical when the accelerometer is at rest, i.e. when it is not subjected to any acceleration. It will however clearly appear to the one skilled in the art that other configurations are possible within the framework of the invention. The capacities of the two capacitors can for example be different, their respective values when the accelerometer is at rest being for example measured during a calibrating process.

The central parts 10, 20 resp. 30 of the lower layer 1, middle layer 2 and upper layer 3 form the active part 5 of the accelerometer that comprises the centrifugal mass 28 and the two electrodes. The base elements 12, 22 resp. 32 of these same layers form the bases 6 of the accelerometer through which it is fastened to the support 8.

According to a preferred embodiment of the invention, two rigid elements 27 fixedly united with the central part 5 of the accelerometer and whose function will be explained further below extend to the bases 6. According to the example illustrated by the FIGS. 1 and 2, these rigid elements are beams 27 formed on the middle layer 2 and fixedly united with the frame 29, and which are inserted in recesses formed in the bases 6. Each beam 27 extends between two base elements 22 of the middle layer 2 which forms, with the corresponding base elements 12 and 32 of the lower layer 1 and upper layer 3 one of the two bases 6. The space between the extremity of the beam 27 and the base elements 22 is closed on two sides by the base elements 12 and 32, thus forming in the base 6 a recess in which the beam 27 is partially lodged. The section of each recess is greater than the cross section of the corresponding beam 27 so as to allow the latter a certain movement in its recess, at least along an axis X more or less parallel to the plane of the support 8.

The middle layer 2 is preferably formed on the lower layer 1 by means of the SOI (Silicon On Insulator) technology. According to this technology, a semiconductor layer, preferably of small thickness, is deposited on the structured substrate and at least partially covered with an insulating layer (not represented) forming the lower layer 1. After being deposited, this silicon layer is in its turn structured in order to form there the desired elements, for example the centrifugal mass 28, the base elements 22, the fasteners 21 and the beams 27.

The SOI technology allows perceptibly finer depositing and structuring of silicon layers than the usual substrates, thus allowing on the one hand to minimize the thickness of the multilayer semiconductor components and on the other hand to form on the finer layer mechanical microelements with reduced dimensions and offering particular mechanical properties, that cannot be achieved on thicker layers.

The upper layer 3 is preferably structured separately and then attached in determined zones on the middle layer 2. According to a variant embodiment, the upper layer 3 is soldered on the middle layer 2, for example with the SFB (Silicon Fusion Bonding) technology. The zones to which the two layers 2 and 3 are attached to one another are essentially distributed on the base elements 22 and 32 and on the frame 29 surrounding the centrifugal mass 28. The bumpers 37 are not affixed on the middle layer 2 so as to allow their relative movement relatively to the fasteners 21 which they partially cover.

The lower layer 1 and middle layer 2, on the one hand, as well as the upper layer 3 on the other hand, are preferably formed from semiconductor wafers, for example of silicon, that allow the simultaneous forming of the elements of several hundreds or even several thousands of generally identical accelerometers, according to well known techniques in the field of electronic chip manufacturing. The wafers are then assembled, for example soldered with the SFB technology so as to form simultaneously a plurality of accelerometers that are then extracted individually from the wafers.

According to a variant embodiment of the invention (not represented), an electronic circuit for measuring the variations in capacity of the accelerometer and possibly the interpretation of these measurements is also formed on the lower, intermediary and/or upper layers. The electronic circuit then comprises a plurality of semiconductor components arranged for example on a specific part of the active part and/or on a part directly connected with the base elements.

According to a preferred embodiment of the invention illustrated by the FIGS. 1 and 2, the accelerometer comprises two bases 6 through which it can be fastened onto a support 8. The bases 6 are preferably fastened to the support 8 by means of an adhesive matter 60, for example glue adapted to the materials of the accelerometer and of the support, allowing an affixing sufficient so that the accelerometer does not come unstuck when the support 8 is subjected to strong accelerations. The fastening of the accelerometer on the support 8 is for example sufficient to resist to accelerations whose absolute value is greater to several tens of thousands times g.

According to a preferred embodiment, the support 8 is a printed circuit or a ceramic support comprising for example an electronic circuit (not represented) electrically connected to the accelerometer's electrodes. The electronic circuit allows for example the measurement of the variations in capacity of the accelerometer's capacitors, the conversion of these measurements into a digital signal and possibly their interpretation. According to a variant embodiment, the electronic circuit also allows electrostatic forces to be generated for regulating the position of the centrifugal mass when the accelerometer is subjected to an acceleration.

The inventive accelerometer and the support 8 thus form a device capable of being fastened to any object whose acceleration must be measured. This device preferably directly delivers an electrical analog and/or digital signal corresponding to the value and/or to the direction of the acceleration borne by the device along the measuring axis, and thus also by the object to which it is fastened.

According to a variant embodiment, the electronic circuit further comprises an integrated circuit allowing the electrical values measured by the accelerometer to be processed. The integrated circuit receives for example a clock signal allowing the measurement at determined instants, for example at regular intervals, of the acceleration borne by the device. The integrated circuit then performs for example interpolation and/or extrapolation functions in order to determine the acceleration borne by the device as a function of time, with the aim for example to represent graphically this acceleration on the display of a calculator connected to the device. The integrated circuit also allows for example the maximum acceleration borne by the device and/or the instant at which this acceleration has been measured to be determined. The electronic circuit also preferably comprises a memory zone allowing the permanent or temporary storage of the measured values and/or of the functions calculated by the integrated circuit, for example with a view to subsequently retrieving and/or representing these data.

The active part 5 of the accelerometer is connected to the bases 6 by the fasteners 21. It is not fastened directly on the support 8 from which it is separated by a space preferably corresponding more or less to the thickness of the adhesive matter 60. Any direct mechanical coupling of the support 8 and of the active part 5 is thus avoided. When the accelerometer is fastened to the support 8, the active part 5 is suspended between the bases 6 by the fasteners 21. It can thus, within certain limits explained further below, move relatively to the supports 6 along the three linearly independent axes X, Y and Z. The active part 5 can also preferably perform rotations relatively to the support 6 around these three axes X, Y, Z.

The active part 5 thus constitutes a mechanically stable part practically free from any external mechanical constraint, in particular from any constraint exerted on the bases 6 during their fastening onto the support 8 and/or because of constraints, for example torsion and/or flexion, subsequently exerted on the support 8, for example when it is being fastened on the object whose acceleration is to be measured. Thanks to their elasticity, the fasteners 21 guarantee a good isolation of the active part 5 by absorbing these mechanical constraints induced on the bases 6 and thus avoid a mechanical deformation of the active part 5 that would risk modifying the geometry of the electrodes and thus falsifying the measurement. The inventive accelerometer thus makes it possible to guarantee a reliable and accurate measurement, whatever the intensity and direction of the adhesion forces holding the accelerometer on the support 8 and/or the torsion or flexion subsequently sustained by the support 8.

As previously mentioned, the fasteners 21 are preferably formed so as to offer a maximum elasticity in the direction of the axis X more or less parallel to the plane of the support 8 and along which are aligned the active part 5 and the supports 6. Indeed, this elasticity allows in particular possible inaccuracies in the distance of the bases 6 during fastening of the accelerometer onto the support 8 to be largely compensated.

The bumpers 37, formed for example on the central part 30 of the upper layer 3, preferably work together with the bases 6 to limit the amplitude of the accelerometer's movements along this axis X, so that in case of an acceleration in this direction, the fasteners 21 are in no case stretched beyond their elasticity range. Preferably, the bumpers 37 are constituted of protruding portions of limited length formed on the lateral sides of the active part 5 located opposite the bases 6. The displacements of the central part 5 along the axis X are thus limited by the distance between the bumpers 37 and the upper part 32 of the bases 6, this distance being determined so as to avoid any irreversible deformation and/or rupture of the fasteners 21.

In the illustrated example, the bumpers 37 are formed in the central part 30 of the upper layer 3. The one skilled in the art will however understand that these bumpers can also be formed on other parts of the upper layer 3, for example on the corresponding base element 32, or on another layer, for example on the lower layer 1 or middle layer 2. It is also perfectly conceivable, within the framework of the invention, to provide other mechanical elements independent from the bases 6 designed to limit the run of the bumpers 37 and thus of the active part 5 along the axis X. Any combination of the aforementioned solutions is furthermore also possible.

According to the preferred embodiment of the invention illustrated by the FIGS. 1 and 2, the fasteners 21 also have a certain elasticity in the direction of an axis Y more or less parallel to the plane of the support 8 and perpendicular to the axis X in order to, among others, compensate a possible inaccuracy in the alignment of the bases 6 during their fastening onto the support 8.

In the direction of the axis Z perpendicular to the plane of the support 8, the elasticity of the fasteners 21 is however preferably minimal so as to hold the active part 5 suspended between the bases 6 when the accelerometer is at rest, in particular to avoid that it is in direct contact with the support 8 and preferably to avoid also that the beams 27 come to rest against one of the lower sides of their respective recesses, whatever the orientation of the device.

Furthermore, since the axis Z corresponds in this variant embodiment of the invention also to the axis of measurement of the accelerometer, it is advantageous that the displacements of the active part 5 relatively to the bases 6 and to the support 8 along this axis Z should not be too considerable so that they do not significantly influence the measurement.

According to the preferred embodiment of the invention described here by way of example, the displacements of the active part 5 relatively to the bases 6 along the axes Y and Z are limited by the beams 27 fixedly united to the active part 5 and working with the recesses formed by the bases 6. Preferably, the beams 27 extend in the direction of the axis X, an axis in which the movements of the active part 5 are limited by the bumpers 37 described above. The dimensions of the cross sections of the recesses are greater than the dimensions of the cross sections of the beams 27, so that the latter can move freely in their respective cavity along the axis X. The displacements of the beams 27 along the axes Y and Z are however limited by the space between the outer sides of the beams 27 and the inner sides of the recesses. Since the beams 27 are fixedly united with the active part 5 of the accelerometer, the amplitude of the latter's displacements is also limited along these two axes. The space between the outer sides of the beams 27 and the inner sides of the recesses is determined so that when the device is subjected to an acceleration along the axis Y and/or Z, the displacement of the active part 5 relatively to the bases 6 along one of these axes cannot stretch the fasteners 21 beyond their elasticity limit, thus avoiding their irreversible deformation and/or their rupture.

The elasticity of the fasteners 21 determined by their particular geometry also allows a rotation of the active part 5 relatively to the bases 6 around the axes X, Y and/or Z, thus contributing to an optimum isolation of the active part from mechanical constraints that can be exerted on the bases 6. The amplitude of these rotations is however limited in order to avoid any irreversible deformation and/or rupture of the fasteners 21.

Preferably, the cross sections of the beams 27 and of the recesses are thus of a geometrical form having no rotation axis, for example rectangular, triangular, trapezoidal etc., so as to limit the rotation of the beams 27 in their recess, thus limiting the rotation of the active part 5 relatively to the bases 6 around the axis X. Preferably, the beams 27 are furthermore lodged in their recess over a sufficient length to also limit the rotation of the active part 5 along the axis Z and/or Y inside the desired limits.

The amplitude of the movements of the central part 5 relatively to the bases 6 along and/or around any axis is thus strictly limited by the bumper elements, on the one hand by the bumpers 37 working with the supports 6 and on the other hand by the beams 27 working with the recesses formed in the bases 6. Preferably, the maximum amplitude of these displacements is determined so that when the accelerometer is fastened onto a support 8, the active part 5 cannot stretch the elastic fasteners 21 beyond their limit of elasticity, thus avoiding any irreversible deformation and/or rupture of the latter, even in extreme use conditions.

The active part 5 suspended between the bases 6 by the fasteners 21 can thus, under the effect of an external force, move relatively to the support 8 thanks to the elasticity of the fasteners 21. However, after a determined displacement, the active part is blocked in at least one direction so that the fasteners 21 are not stretched beyond their elasticity range. It is thus ensured, thanks to the inventive device, that even in extreme conditions, the fastening elements 21 will not be subjected in normal operation mode to any mechanical constraint capable of causing their irreversible deformation and/or their rupture.

The maximum amplitude of the displacements of the active part 5 relatively to the support 6 is determined in particular by the dimensions of the bumpers 37 on the one hand and by the relative dimensions of the beams 27 and of the corresponding recesses in the bases 6 on the other hand.

In the example described here above, the beams 27 fixedly united with the active part 5 are formed by structuring of the middle layer 2. The one skilled in the art will however understand that other embodiments are also conceivable within the framework of the invention. The beams can for example be formed on the lower layer 1 or upper layer 3. In the latter case, the beams are preferably held at least partially in the direction of the perpendicular axis Z by depositing or soldering of an additional layer on at least part of the upper layer 3.

It is also conceivable, within the framework of the invention, to form a beam or any other rigid element so that it is fixedly united for example with one of the bases and that it inserts in a recess provided to this effect in the active part. It is also possible to limit the amplitude of the displacements of the active part relatively to the bases by combining a rigid element fixedly united with the active part working with a recess formed in a basis of the accelerometer and of a rigid element fixedly united with a basis and working with a recess formed in the active part.

In the example described here above, the accelerometer comprises two beams 27 limiting the movements of the active part 5 relatively to the bases 6 along and around several axes X, Y, Z. It would however be conceivable, within the framework of the invention, to form only a single rigid element.

It is also conceivable to form more than two rigid elements by structuring one or several layers of semiconductor material. According to a variant embodiment, all the rigid elements thus formed then have more or less the same function and work with similar recesses in order to limit the movements of the active part along and/or around the same axes. According to another embodiment, each rigid element has a different shape and/or orientation and/or works with a recess formed differently in order to limit the movements of the active part along and/or around one or several different axes.

According to a variant embodiment, the rigid elements working with the respective recess allow the displacements and rotations of the active part along and around the three linearly independent axes X, Y, Z to be limited. According to this embodiment, the bumpers 37 are for example replaced by dummy recesses limiting the amplitude of the movements along the axis X of the corresponding beam. According to another embodiment, the cross section of each beam varies over its length so that only a determined length can be inserted in the recess, thus also limiting the amplitude of the displacements of each beam in its recess along the axis X.

The centrifugal mass 28 of the accelerometer described here above in a preferred embodiment of the invention moves between the electrodes of the active part along a direction parallel to the axis Z. The accelerometer thus allows accelerations occurring in the direction of the axis Z to be measured. Thanks to the limitation of the displacements along this measuring axis of the active part 5 relatively to the bases 6 with the bumper elements described further above, the inventive accelerometer makes it in particular possible to avoid that the fasteners 21 be damaged by the accelerations, even very strong, that the accelerometer is to measure and/or by accelerations going beyond the accelerometer's measuring range.

According to one application, the inventive accelerometer is for example fastened to a projectile in order to measure the accelerations borne by the latter during its flight. The absolute value of these accelerations is usually situated between some g and some hundreds g, for example between 2 g and 100 g. The active part 5 of the inventive accelerometer, in particular the centrifugal mass 28 and the flexible part 290, is then preferably dimensioned so as to make it possible to measure accurately accelerations inside this range.

During the shot, the projectile however bears accelerations that can reach several tens of thousands times g, for example more than 20,000 g. Thanks to the limitation of the movements of the active part 5 relatively to the bases 6 preferably along all the axes and in particular along the measuring axis, the inventive accelerometer fastened to the projectile is capable of resisting to such accelerations without becoming damaged. During the shot, the beams 27 and/or the bumpers 37 are thus resting against a wall of the recesses, respectively against one of the bases 6, thus avoiding that the fasteners 21 become irreversibly deformed or ruptured. After the shot, when the projectile's acceleration is again situated within the measuring range of the accelerometer, the active part 5 is preferably again freely suspended to the bases 6 by the fasteners 21 without the bumper devices 37 and/or 27 resting, and the active part 5 again takes up the measurement of the accelerations sustained along the axis Z.

Another variant embodiment of the inventive accelerometer is illustrated by FIGS. 3 and 4. Barring contrary indication, the same references designate the same elements on all the FIGS. 1 to 4.

According to this embodiment, the active part 5 is connected to each of the two bases 6 by the fasteners 21'. The bumper elements limiting the movements of the active part 5 along the axis X are bumpers 37' formed on the base elements 32 of the upper layer 3. Each base element 32 comprises a bumper 37' placed opposite the active part 5 and protruding relatively to the other base elements 12 and 22 of the other layers. Each bumper 37' covers at least partially one fastener 21'.

According to this embodiment, the movements of the active part 5 along the axis Z are limited, in one direction at least, by the bumpers 37' working with the rigid parts 27' through which the fasteners 21' are connected to the active part 5, partly to the frame 29. These rigid parts 27' in fact form beams fixedly united with the frame 29 and thus with the active part 5, whose run along the axis Z is limited, in one direction, by their coming to rest against the bumpers 37'. In the other direction, the movements of the active part 5 are limited by it resting against the upper layer of the support 8. The amplitude of the displacements of the active part 5 relatively to the bases 6 along the perpendicular axis Z are thus limited by bumper elements comprising rigid parts 27' fixedly united with the active part 5 and working with the bumpers 37'. In the other direction, these movements are limited by the surface of the support 8 onto which the accelerometer is fastened. It is however possible to imagine, to fulfill this function, to form on the base elements 12 of the lower layer 1 bumpers similar to the bumpers 37'. The bumpers of each base then constitute an elongated and open recess into which a rigid part 27' fixedly united with the active part 5 is inserted.

According to the embodiment illustrated by the FIGS. 3 and 4, the amplitude of the movements of the active part 5 relatively to the bases 6 along the axis Y are not limited by the bumper elements. The fasteners 21' are however formed in such a manner that their rigidity is sufficient to resist to strong accelerations in this direction without sustaining irreversible damages.

Also according to this embodiment, the rotation movements of the active part relatively to the bases 6 are limited by the bumper elements 37', 27' and by the upper layer of the bases 6.

According to the embodiments described here above, the movements of the accelerometer along an axis Z perpendicular to the support 8 are limited by the rigid elements 27, 27' fixedly united with the active part 5 and working at least partially with the bases 6. It is however conceivable, within the framework of the invention, to limit the movements of the active part by an external device, in particular, though not exclusively, in a direction perpendicular to the plane of the support 8. This external device is for example a hood fastened onto the support 8 and encasing at least partially the accelerometer. The inside profile of the hood works for example together with bumpers formed on the active part of the accelerometer in order to limit the amplitude of the latter's movements.

According to the embodiments described here above by way of example and illustrated by the figures, the accelerometer comprises two bases 6 placed on each side of the active part 5 for fastening it on a support 8. This arrangement of the bases 6 makes it possible to make extremely compact accelerometers. The one skilled in the art will however understand that, within the framework of the invention, the semiconductor layers forming the accelerometer can be structured so as to form a different number of bases, or to form bases of different shapes and arrangements. The active part can thus for example be suspended to a frame surrounding it entirely or on three of its sides only, etc. It would also be conceivable, within the framework of the invention, to imagine structures comprising several active parts comprising for example each an accelerometer and suspended to common bases or a common frame.

The invention is described here above for the particular case of an accelerometer whose active part 5 must be isolated from any mechanical constraint exerted on other parts of the accelerometer, in particular on the bases 6 during and/or after its fastening. The one skilled in the art will however understand that the present invention is also applicable to any other component, in particular to any other MEMS of which a sensitive part, generally an electromechanical active part, must be isolated from any external mechanical constraint, in particular from any constraint exerted on its fastening elements.

The invention claimed is:

1. A microelectromechanical system (MEMS) comprising:
    an electromechanical active part,
    at least one base for fastening said microsystem on a support,
    at least one fastener fastening said active part to said at least one base and allowing a displacement of said active part relatively to said at least one base along an axis more or less perpendicular to the plane of said support when said microsystem is fastened onto said support,
    bumper elements for limiting the amplitude of the displacements of said active part relatively to said at least one base along said perpendicular axis.

2. The microsystem of claim 1, said microsystem being an accelerometer, said active part comprising a centrifugal mass whose displacements along at least one measuring axis cause variations of an electrical value.

3. The microsystem of claim 2, said at least one measuring axis being more or less parallel to said perpendicular axis.

4. The microsystem of claim 1, said at least one fastener allowing a displacement of said active part relatively to said at least one base along an axis more or less parallel to the plane of said support when said microsystem is fastened onto said support, said microsystem comprising bumper elements for limiting the amplitude of the displacements of said active part relatively to said at least one base along said parallel axis.

5. The microsystem of claim 1, said at least one fastener allowing displacements of said active part relatively to said at least one base along two linearly independent axes more or less parallel to the plane of said support when said microsystem is fastened onto said support, said microsystem comprising bumper elements for limiting the amplitude of the displacements of said active part relatively to said at least one base along said two parallel axes.

6. The microsystem of claim 1, said at least one fastener allowing a rotation of said active part relatively to said at least one base around said perpendicular axis, said microsystem comprising bumper elements for limiting the amplitude of the rotations of said active part relatively to said at least one base around said perpendicular axis.

7. The microsystem of claim 1, said at least one fastener allowing a rotation of said active part relatively to said at least one base around an axis more or less parallel to the plane of said support when said microsystem is fastened onto said support, said microsystem comprising bumper elements for limiting the amplitude of the rotations of said active part relatively to said at least one base around said parallel axis.

8. The microsystem of claim 1, said at least one fastener allowing rotations of said active part relatively to said at least one base around two linearly independent axes more or less parallel to the plane of said support when said microsystem is fastened onto said support, said microsystem comprising bumper elements for limiting the amplitude of the rotations of said active part relatively to said at least one base around said two parallel axes.

9. The microsystem of claim 1, said active part being suspended to said at least one base by said at least one fastener when said at least one base is fastened onto said support.

10. The microsystem of claim 1, said at least one fastener being elastic, said bumper elements limiting the amplitude of the movements of said active part relatively to said at least one base inside the elasticity range of said at least one fastener.

11. The microsystem of claim 10, the elasticity of said at least one fastener being different according to the directions.

12. The microsystem of claim 11, the elasticity of said at least one fastener being maximal along an axis more or less parallel to the plane of said support and minimal along an axis more or less perpendicular to the plane of said support.

13. The microsystem of claim 1, said bumper elements comprising at least one bumper formed on said active part and working with said at least one base for limiting the amplitude of the displacements of said active part relatively to said at least one base along an axis more or less parallel to the plane of said support.

14. The microsystem of claim 13, said bumper being constituted of a protruding part on a side of said active part opposite said at least one base, the length of said bumper being perceptibly shorter than the length of said side.

15. The microsystem of claim 1, said bumper elements comprising at least one bumper formed on said at least one base and working with said active part for limiting the amplitude of the displacements of said active part relatively to said at least one base along an axis more or less parallel to the plane of said support.

16. The microsystem of claim 1, said bumper elements comprising at least one rigid mechanical element fixedly united with said active part and working with said at least one base for limiting the amplitude of the displacements of said active part relatively to said at least one base along an axis more or less perpendicular to the plane of said support.

17. The microsystem of claim 16, said at least one rigid mechanical element being a beam working with a recess formed in said at least one base.

18. The microsystem of claim 1, said bumper elements comprising at least one rigid mechanical element fixedly united with said at least one base and working with said active part for limiting the amplitude of the displacements of said active part relatively to said at least one base along an axis more or less perpendicular to the plane of said support.

19. The microsystem of claim 18, said at least one rigid mechanical element being a beam working with a recess formed in said active part.

20. The microsystem of claim 16, said at least one rigid mechanical element further limiting the amplitude of the displacements of said active part relatively to said at least one base along an axis more or less parallel to the plane of said support.

21. The microsystem of claim 16, said at least one rigid mechanical element further limiting the amplitude of the rotations of said active part relatively to said at least one base around an axis more or less parallel to the plane of said support.

22. The microsystem of claim 16, said at least one rigid mechanical element further limiting the amplitude of the rotations of said active part relatively to said at least one base around two linearly independent axes more or less parallel to the plane of said support.

23. The microsystem of claim 16, said at least one rigid mechanical element further limiting the amplitude of the rotations of said active part relatively to said at least one base around an axis more or less perpendicular to the plane of said support.

24. The microsystem of claim 1, comprising at least three superimposed layers of conducting material, said at least three layers comprising a lower layer, an middle layer and an upper layer.

25. The microsystem of claim 24, said middle layer being formed and structured on said lower layer or on said upper layer.

26. The microsystem of claim 25, said middle layer being formed by depositing semiconductor material onto an isolating surface formed on said lower layer or on said upper layer (SOI, Silicon on Insulator technology).

27. The microsystem of claim 24, said at least one fastener being formed by structuring said middle layer.

28. The microsystem of claim 24, at least one bumper element of said bumper elements being formed by structuring said middle layer.

29. The microsystem of claim 28, said at least one bumper element being a beam fixedly united with said active part and extending until said at least one base.

30. The microsystem of claim 28, said at least one bumper element being a beam fixedly united with said at least one base and extending until said active part.

31. The microsystem of claim 29, said beam being at least partially lodged in a recess formed by structuring said middle layer around said beam, the perimeter of said recess being closed by said lower layer and by said upper layer.

32. The microsystem of claim 1, comprising two bases arranged on either side of said active part, said active part being fastened to said at least one base by four fasteners.

33. Device comprising a microsystem according to claim 1 and a support, said microsystem being fastened onto said support.

34. Device according to claim 33, said support further comprising an electronic circuit for managing said active part.

35. Device according to claim 34, said microsystem being an accelerometer, said electromechanical device comprising a centrifugal mass whose displacements along at least one measuring axis cause variations of an electric value, said electronic circuit allowing said variations to be interpreted.

36. Device according to claim 33, a hood being fastened onto said support around said microsystem for limiting the amplitude of the displacements of said active part.

* * * * *